Aug. 17, 1954  F. BERGMANN  2,686,432
MECHANICAL INFINITELY VARIABLE SPEED TRANSMISSION
Filed Oct. 28, 1949  3 Sheets-Sheet 1

Fritz Bergmann
INVENTOR.

BY
Attorneys

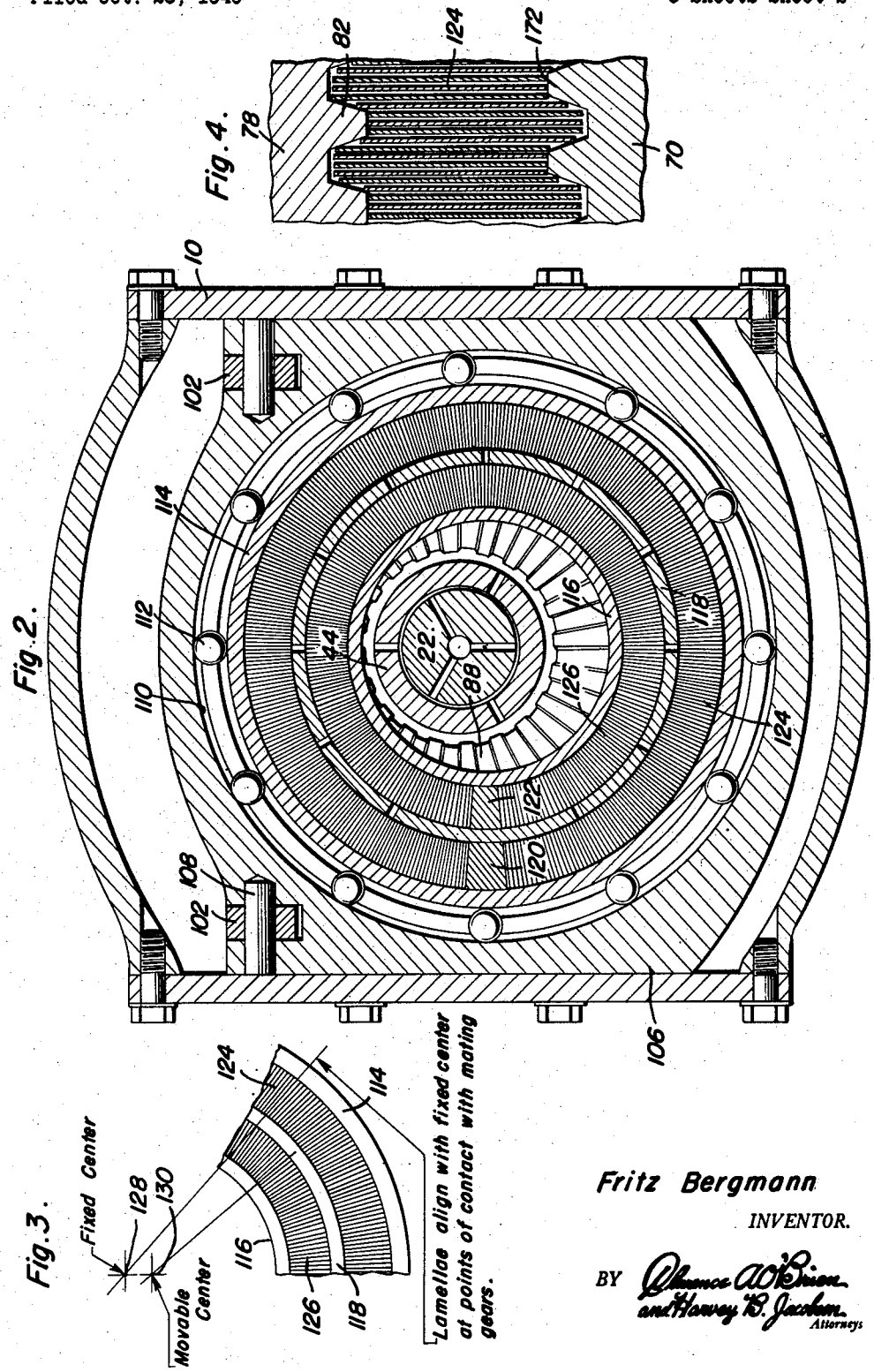

Aug. 17, 1954  F. BERGMANN  2,686,432
MECHANICAL INFINITELY VARIABLE SPEED TRANSMISSION
Filed Oct. 28, 1949  3 Sheets-Sheet 3

Fritz Bergmann
INVENTOR.

Patented Aug. 17, 1954

2,686,432

UNITED STATES PATENT OFFICE 2,686,432

MECHANICAL INFINITELY VARIABLE SPEED TRANSMISSION

Fritz Bergmann, Kempten, Allgau, Germany, assignor to Walter E. Gudert, Kempten, Allgau, Germany Application October 28, 1949, Serial No. 124,162

5 Claims. (Cl. 74—325)

1

This invention comprises novel and useful improvements, in a mechanical infinitely variable speed transmission and more specifically pertains to a transmission assembly for connecting a driving to a driven shaft in an improved manner to permit the maintaining of a positive mechanical connection between the shafts at speed ratios which may be varied by infinitesimal increments over the neutral position in either direction of rotation of the driven shaft.

The principal object of this invention is to provide an improved infinitely variable mechanical speed transmission connecting a driving and a driven shaft which shall admit of an infinite series of speed ratios within its ranges of adjustment, which shall be of relatively few parts and of simple and inexpensive construction, which shall be extremely compact and which shall be highly efficient as a power transmission mechanism for the purposes intended.

These, together with various ancillary features and objects of the invention which will later become apparent as the following description proceeds, are attained by the present invention, a preferred embodiment of which has been illustrated by way of example only in the accompanying drawings, wherein:

Figure 2 is a vertical transverse sectional view through the movable element of the variable speed transmission of Figure 1;

Figure 3 is a diagrammatic view illustrating the operation of certain features of the invention;

Figure 4 is a fragmentary sectional view of a portion of the invention; and,

Figure 1:
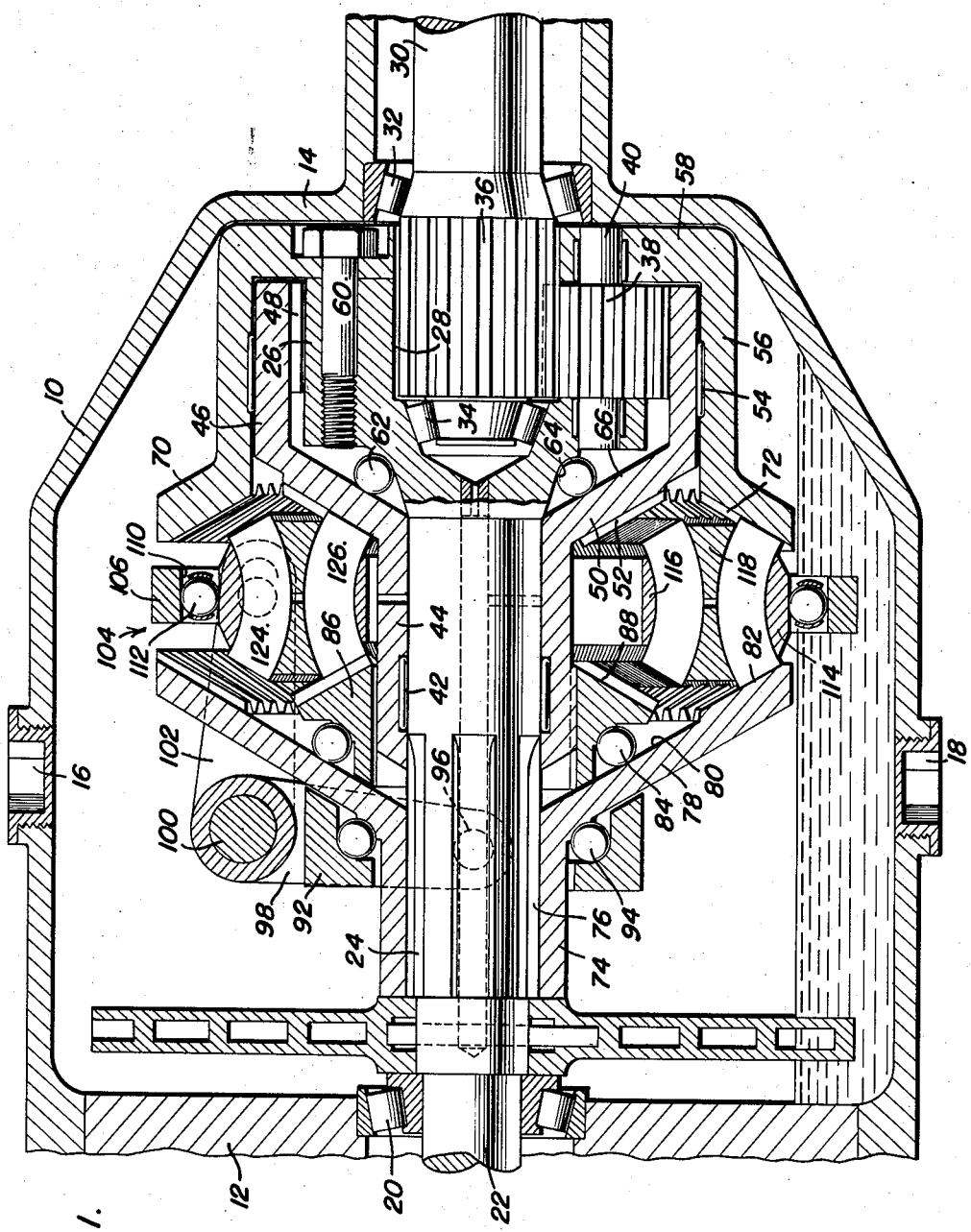
Figure 1 is a fragmentary vertical sectional longitudinal view through a suitable embodiment of apparatus incorporating the principles of this invention.

Referring now more specifically to the accompanying drawings, wherein like numerals designate similar parts throughout the various views, especial reference is now made to Figure 1 where it will be seen that the numeral 10 indicated generally a casing which houses the transmission mechanism forming the subject of this invention, and which may conveniently comprise part of the power transmission mechanism of an automotive vehicle or the like, this casing having the customary front and rear end walls 12 and

2

14 together with a lubricant filling and lubricant draining plug 16 and 18 respectively.

Journaled in the end wall 12, as by means of a thrust bearing or the like 20, is a driving or power shaft which transmits the power of the engine of the vehicle to the variable speed transmission mechanism. The shaft 22 upon the interior of the casing 10 is provided with a splined portion 24 and at its inner extremity is provided with an annularly enlarged drum-like member 26 which is axially bored as at 28.

Extending through the other end wall 14 of the case 10, is a driven shaft 30 which may conveniently comprise or be connected with the propeller or driving shaft of an automotive vehicle with which the transmission is to be associated, the driven shaft 30 extending into the above mentioned internal bore 28 of the annular member 26.

The drive shaft 30 is provided with suitable thrust bearing assemblies 32 and 34 respectively seated in the end wall 14 and in the bottom of the bore 28 in the member 26, whereby the forward end of the driven shaft 30 is rotatably journaled within the adjacent end of the driving shaft 22. This inward extremity of the driven shaft 30 is provided with suitable gear teeth 36, forming a sun gear of a planetary gear train to be hereinafter described. If desired, the gear teeth 36 could be formed as a separate gear which is detachably secured to the extremity of the driven shaft 30.

One or more planet gears 38 are received in suitable radial slots in annular member 26 on the end of the driving shaft, these planet gears being mounted upon suitable axles 40 which are journaled in the above mentioned enlarged portion 26 on opposite sides of the radial slots through which extend the planet gears 38. These planet gears are so disposed as to be continuously enmeshed with the sun gear 36.

Freely and rotatably journaled on the driving shaft 22 as by means of a roller or needle bearing assembly 42, is the hub portion 44 of an intermediate member having an annularly enlarged and drum like rear portion 46 which is internally toothed as at 48 to provide an orbit gear for the planetary gear system. This orbit gear 48 is continuously enmeshed with the above mentioned planet gears 38. The orbit gear member 46 is preferably integrally connected with the sleeve portion 44 as by a frusto-conical member 50 disposed at any desired inclination with respect to the longitudinal axis of the axially aligned driving and driven shafts 22 and 30, the outer surface of the frusto-conical portion 50 being provided with a series of gear teeth 52 forming a beveled gear surface upon the frusto-conical member. Freely and rotatably journaled upon the annular member 46 of the orbit gear, as by a needle bearing assembly 54, is the drum-like member 56, having an end wall portion 58 and which is detachably secured as by fastening bolts 60 to the above mentioned enlarged portion 26.

Figure 5:
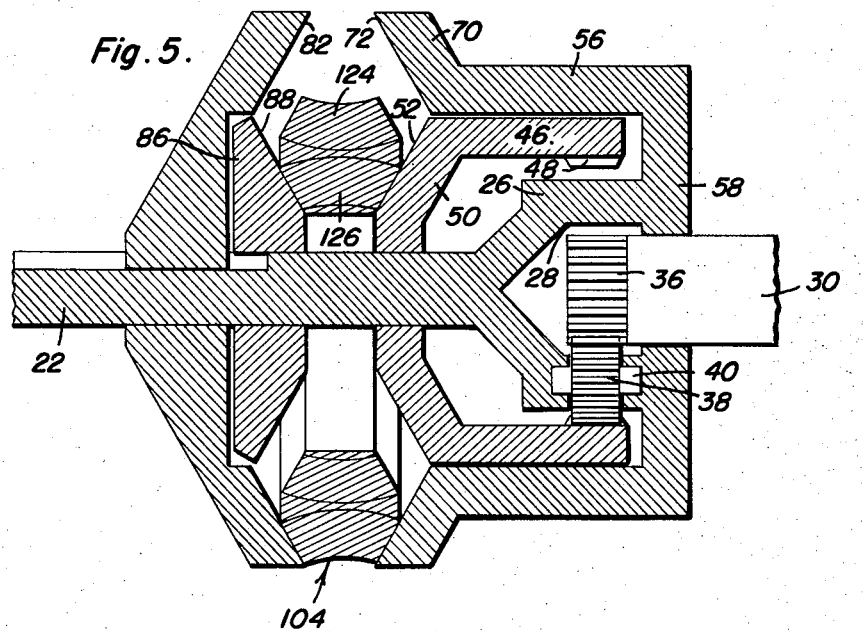
Figures 5 and 6 are diagrammatic vertical central longitudinal sectional views of the arrangement of Figure 1, but showing the operating parts of the mechanism in different positions of adjustment.
Figure 6:
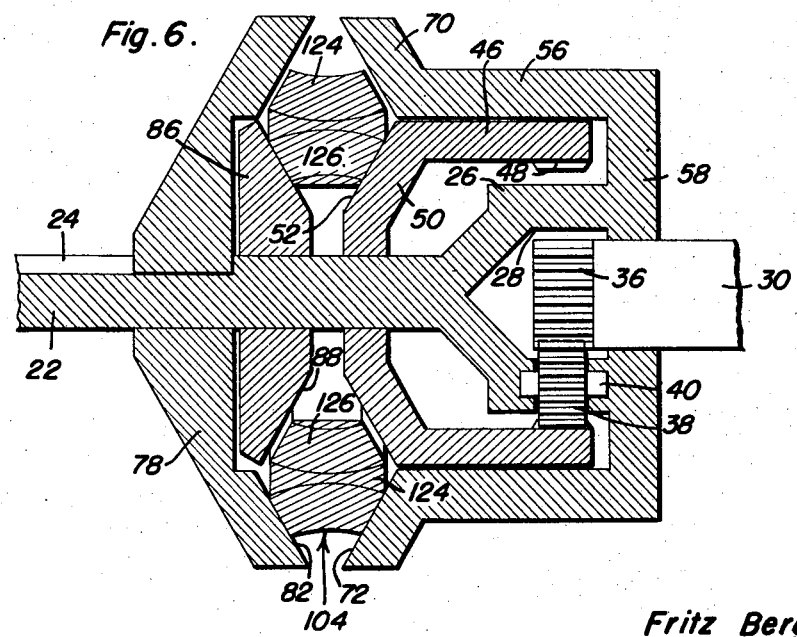

It will now be seen by particular reference to Figure 1 and also with respect to Figures 5 and 6, that the axles 40 upon which the planet gears 38 are mounted, are journaled at one end in the enlarged portion 26 and at their other extremity are journaled in the end wall 58 of the annular member 56.

The enlarged portion 26 is provided with a thrust bearing assembly 62 which engages suitable bearing races 64 and 66 formed respectively upon the adjacent surfaces of the members 26 and 50.

An outwardly flaring frusto-conical flange or portion 70 is formed upon the inner end of the annular member 56, the forward face of this flaring portion being provided with gear teeth 72 constituting a bevel gear for a purpose which will be later apparent.

It will now be seen that the members 56 and 70 with the bevel gear teeth 72 are rigidly and fixedly mounted upon the end of the driving shaft 22 by means of the bolt 60, for rotation therewith, while the planet gears 38 are rotatably journaled upon the driving shaft 22 and the end wall 58 of the member 56 mounted thereon, for rotation therewith and for relative rotation thereon. At the same time, the intermediate member 46 by means of its hub like sleeve 44 is freely rotatable upon the driving shaft 22 and by means of the bearing assembly 54 is freely rotatable within the member 56, and constitutes an orbit gear which is connected with the planet gears 38 and through the same with the sun gear 36 of the driven shaft 30 for transmitting motion therethrough.

The hub portion 74 is provided with splines 76 whereby the same is slidingly but non-rotatably secured upon the rotating drive shaft 22, upon the splines 24 thereof. The hub 74 is provided with a frusto-conical, flaring portion 78 having an inclined bearing surface 80 thereon, together with gear teeth 82 forming a bevel gear. The bevel gear teeth 82 make the same angle with a plane transverse and perpendicular to the axis of the driving and driven shafts, as do the bevel gear teeth 72 of the member 70, and the members 78 and 70 form a driving means for transmitting power from the driving shaft 22 to the driven shaft 30 as set forth hereinafter. A suitable bearing assembly 84 is journaled upon the surface 80 and upon a corresponding surface of the hub portion 86 which is provided with bevel gear teeth 88, and which is splined upon the extremity of the hub 44 of the member 50. It may be here noted that the members 86 and 50 constitute a driven means actuated by the driving means 78 and 70, and cooperating therewith for transmitting power from the driving to the driven shaft. It may be further noted that the bevel gear teeth 88 and 52 form the same angle with opposite sides of a transverse perpendicular plane to the longitudinal axis of the driving and driven shafts.

It will now be seen that while the driving member 70 is immovable both longitudinally and circumferentially of the driving shaft, the driving means 78 while being non-rotatable thereon is slidable actually thereof towards and from the member 70. To effect this sliding movement, as required and explained hereinafter, there is provided an annular member or collar 92 surrounding the hub 74, and journaled thereon as by a thrust bearing assembly 94 engaged in suitable bearing races upon adjacent surfaces of the member 92 and the member 78. Engaged upon diametrically opposite sides of the collar 92, as by pins 96, are arms 98 of bell cranks, which are fixedly secured to and rotatable with an actuating shaft 100, these bell cranks having angularly disposed arms 102, which as shown more clearly in Figure 2, are pivotally connected to a flexible coupling assembly indicated generally by the numeral 104 and which is operatively disposed between the members of the driving and driven means previously described.

For this purpose, the flexible coupling 104 preferably includes a slide 106 which may be of any desired shape and which is journaled between side walls of the casing 10 for guided vertically sliding movement therebetween, this slide having appropriate recesses in its upper surface in which the ends of the lever arms 102 are pivoted as by pivot pins 108.

The arrangement is such, that the actuating shaft 100 which may be operated either manually, or by any desired automatic control such as a speed governor, or the like, may be rocked or oscillated, thereby causing a simultaneous sliding movement of the member 78, axially of the driving shaft, and a corresponding and coordinated diametrical transverse motion of the flexible coupling 104 relative to the longitudinal axis of the driving shaft.

It will, of course, be understood that the pivotal connections of the arms 98 and 102 to the members 92 and 106 respectively will be effected with suitable lost motion connection such as elongated slots or the like, to permit the straight line motion of the actuated members, by the oscillating motion of the two bell crank arms.

The slide 106 is provided with an internal bearing race 110 within which is received a bearing assembly 112. By means of this latter assembly, there is journaled an outer ring 114. An inner ring 116 is received within the outer ring, while the intermediate ring 118 is disposed therebetween. Suitable abutments 120 and 122, see Figure 2, are rigidly connected between the outer and inner rings and intermediate ring, and the space between these rings is preferably arcuate in cross section, as will be clearly apparent from Figure 1. Disposed within these arcuate spaces, and extending laterally from the sides of the flexible coupling assembly 104, are annular series of outer and inner lamellae 124 and 126 respectively, each consisting of a plurality of relatively thin, arcuate flexible sheets of a suitable material such as steel, rubber or the like, although a pair of rubber rings could be used between 118, 116 and 116, 114. These flexible sheets or lamellae constitute a flexible driving connection between the driving means and the driven means previously mentioned, for positively and mechanically connecting the same at an infinite variety of speed ratios therebetween.

Preferably, the ends of the arcuate lamellae are so shaped as to perpendicularly engage the corresponding bevel gear teeth 72 or 88 of the driving and driven means.

Any suitable lubricating means may be provided for adequately lubricating the elements of this speed changer transmission, as for example, by providing a predetermined level of lubricant within the casing 10, and transmitting the same to the various elements of the mechanism either by splash, by lubricating circulating system, or both, as desired. Inasmuch as the transmission mechanism hereinbefore set forth is not limited in its utility to any particular lubricating system, it is not deemed necessary to set forth the construction and elements of such a system.

From the foregoing, the operation of the mechanism will now be understood. It will now be assumed that the position of the parts is as shown in Figure 1, in which position the driven shaft 30 is disposed at its greatest speed ratio with respect to the driving shaft 22. With the parts in this position, the motion of the driving shaft 22 is imparted by means of the non-rotatable engagement of the driving members 78 and 70 thereon to the latter, causing rotation of the beveled gear teeth 82 and 72 at the same speed as that of the driving shaft. The extending ends of the lamellae engage the corresponding bevel gear teeth as shown in Figure 4, whereby a positive driving connection is established between the bevel gear teeth of either of the driving member 78 or 70 or both, and the assembly 104 which functions as a flexible coupling. Regardless of the lateral adjustment of the flexible means 104, it will be seen that at some point about the circumference of the driving means and the flexible coupling means, that a point of tangency will exist at which the teeth of the bevel gears of the driving means will engage the lamellae 124. This engagement will cause a non-slipping contact or connection of the flexible coupling assembly with the driving means and thereby cause rotation of the members 114, 118 and 116 at the same surface speed of travel as the driving bevel gear teeth.

During this rotation, the inner set of lamellae 126 will likewise have a point of tangency with the bevel gear teeth 88 or 52 on both of the driven means, and these lamellae will therefore, impart rotation to the driven members 86 and 50 at the same surface speed of travel as that of the lamellae, but obviously at a different speed of rotation compared to that of the driving means 78 and 70.

In order to render this driving engagement and connection of the driving means with the flexible coupling means and of the latter to the driven means, it is noted that both driving and driven means revolve about a common axis which is the axis of rotation of the driving and driven shafts 22 and 30, this axis of rotation constituting what may be termed a fixed center of rotation and identified by the numeral 128 in the diagrammatic view of Figure 3.

The two sets of lamellae 124 and 126, however, together with the members 114, 118 and 116, all revolve about a center of rotation which is the geometrical center or axis of the flexible coupling 104, and this center is movable or shiftable vertically as the slide 106 is moved vertically or transversely of the axis of rotation of the driving and driven shafts, this movable center being designated by the numeral 130 in the diagrammatic view of Figure 3. As will now be apparent from this diagram, the flexible sheets forming the lamellae 124 and 126, are disposed radially of the movable center of rotation 130 and thus, are non-radial with respect to the center of rotation 128 of the bevel gears forming driving and driven means. It will therefore be seen that if slippage is not to occur between the lamellae and the driving and driven means, it is necessary that the lamellae themselves shall be capable of flexing or distortion about their arcuate axis so as to accommodate themselves to the relatively displaced centers of rotation of the lamellae and of the bevel gears of the driving and driven means.

It will be hereunderstood that in certain circumstances it may be desirable to omit one of the set of driving members and one of the set of driven members, provided other means are employed to maintain the lamellae and the flexible coupling means in firm, non-slipping engagement with the adjacent bevel gear surfaces of the driving and driven means. However, duplicate set of driving members and driven members effects the same purpose, by thus maintaining a tight engagement of the driving and driven means with the lamellae of the flexible coupling means to insure a positive, mechanical, non-slipping driving engagement therebetween, this engagement being maintained throughout all ranges of adjustment of the flexible coupling means as set forth hereinafter.

Continuing the operation in the position of the parts shown in Figure 1, it will now be seen that rotation of the driving shaft 22 will impart rotation through the bevel gear member 52 to the annular member 46 at a different speed of revolution from that of the driving shaft. This rotation at the selected different speed, is transmitted by the orbit gear 48 and planet gears 38 to the sun gear 36, and hence to the driven shaft 30.

In this rotation, it will be noted that the member 26 constituting the planet gear carrier is rotating at the same speed as the driving shaft; while the orbit gear 48 of the member 46, is rotating at a different speed depending upon the actual gear ratio between the bevel gears of the driving and driven means through the flexible coupling means. By properly choosing the gear ratios of the planetary system, as well as the effective gear ratios of the driving and driven means, it will be seen that the driven gear 36 will have imparted thereto a speed of rotation which will bear any desired relation to that of the driving shaft 22.

In order to vary the speed ratio of the system, it is merely necessary to actuate the actuating shaft 109 either manually or automatically in any desired manner, to thus shift the flexible coupling 104 vertically or laterally of the axis of rotation of the driving and driven shafts. The bell crank arms will simultaneously raise the assembly 104 from the position shown in Figure 1 and simultaneously shift the member 78 to maintain the above described tight and constant pressure between the driving and driven means and the lamellae. The position shown in Figure 5 diagrammatically indicates the position of the parts shown in Figure 1. As a flexible coupling member is adjusted vertically upward, an intermediate position such as that shown in Figure 6 is now attained. It will now be apparent that in this intermediate position, the surface speed of travel of the bevel gears of the driving means and of the lamellae of the flexible coupling means will be less than that in the position of Figures 1 and 5, since although the speed of rotation of the driving shaft is the same, yet the radius of travel of the driving member has been lessened. Correspondingly, the radius of travel of the bevel gears of the driven means and their engagement with the lamellae has been increased, thus decreasing the relative speed of rotation of the driven means with respect to the driving means, and consequently altering the speed of the driven shaft 30 with respect to the driving shaft 22.

Obviously, by properly proportioning the relative sizes of the driving and driven means, and of the planetary gear system, any desired gear ratio may be attained between driving and driven shafts.

It will now be seen that the abutments 120 and 122 shown in Figure 2 serve to prevent relative circumferential slipping of the lamellae within the annular spaces between the members 118, 116 and 114, so that a positive but flexible torque transmitting means is provided between the driving means and the driven means.

From the foregoing, the construction and operation of the device will now be readily apparent and further explanation is believed to be unnecessary. However, since numerous modifications and changes will be apparent to those skilled in the art after a consideration of the foregoing specification and accompanying drawings, it is not desired to limit the invention to the exact construction shown and described, but all suitable modifications and equivalents may be resorted to falling within the scope of the appended claims.

Having described the invention, what is claimed as new is:

1. A speed changer comprising alined driving and driven shafts, a pair of driving members mounted upon and rotatable with said driving shaft, one of said driving members being mounted upon said driving shaft for sliding movement towards and from the other driving member, a pair of driven members rotatably mounted upon said driving shaft, and operatively connected to said driven shaft, a flexible coupling means resiliently, but positively drivingly connecting said driving members with said driven members, said coupling being disposed between the pair of driving members and between the pair of driven members, said coupling means including concentric inner and outer sets of resilient lamellae, each set of lamellae comprising a plurality of flexible arcuate shape plates in side-by-side arrangement and disposed in a circle, one set having the opposite ends of its lamellae in non-sliding, positive engagement with adjacent surfaces of said pair of driving members and the other set being similarly engaged with said pair of driven members.

2. The combination of claim 1, including means for simultaneously moving said coupling means radially of said driving shaft and moving one of said driving members and one of said driven members axially of said driving shaft to thereby vary the gear ratio between the driving and driven shafts.

3. The combination of claim 2, wherein said pair of driving members have toothed complementary driving surfaces and said pair of driven members have toothed complementary driven surfaces.

4. A speed changer comprising alined driving and driven shafts, a pair of driving members mounted upon and rotatable with said driving shaft, one of said driving members being mounted upon said driving shaft for sliding movement towards and from the other driving member, a pair of driven members rotatably mounted upon said driving shaft, and operatively connected to said driven shaft, a flexible coupling means resiliently, but positively drivingly connecting said driving members with said driven members, said coupling being disposed between the pair of driving members and between the pair of driven members, said driving members being disposed radially outwardly of said driven members.

5. The combination of claim 4, including a bearing assembly interposed between each driven member and a driving member.

References Cited in the file of this patent

UNITED STATES PATENTS

| Number | Name | Date |
|---|---|---|
| 795,386 | Cutter | July 25, 1905 |
| 1,242,618 | Stevens | Oct. 9, 1917 |
| 1,717,019 | Ferrari | June 11, 1929 |
| 2,026,928 | Back et al. | Jan. 7, 1936 |
| 2,066,748 | Bassoff | Jan. 5, 1937 |
| 2,407,114 | Tyler et al. | Sept. 3, 1946 |
| 2,455,407 | Christmann | Dec. 7, 1948 |
| 2,500,723 | Ware | Mar. 14, 1950 |
| 2,573,140 | Heth | Oct. 30, 1951 |

FOREIGN PATENTS

| Number | Country | Date |
|---|---|---|
| 2,569 | Australia | Mar. 15, 1927 |
| 71,772 | Norway | Mar. 3, 1947 |
| 524,946 | Germany | May 20, 1931 |